W. SCHÄFER.
WINDOW FRAME.
APPLICATION FILED APR. 1, 1911.
1,088,376.
Patented Feb. 24, 1914.
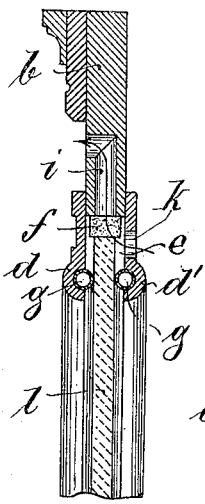
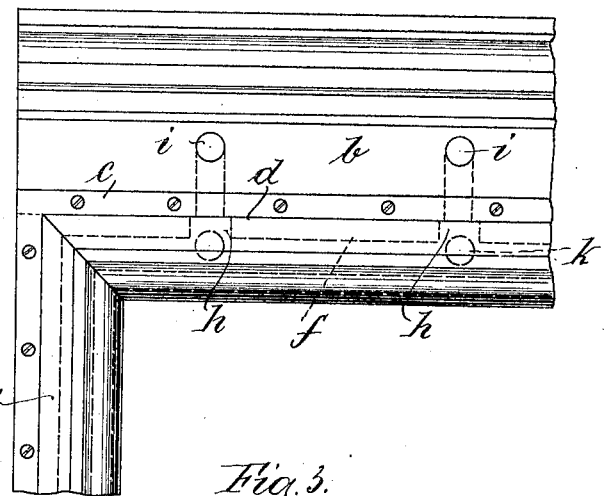
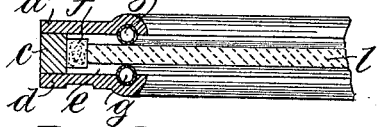
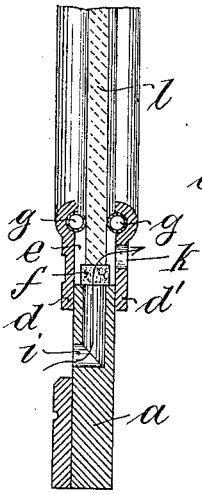
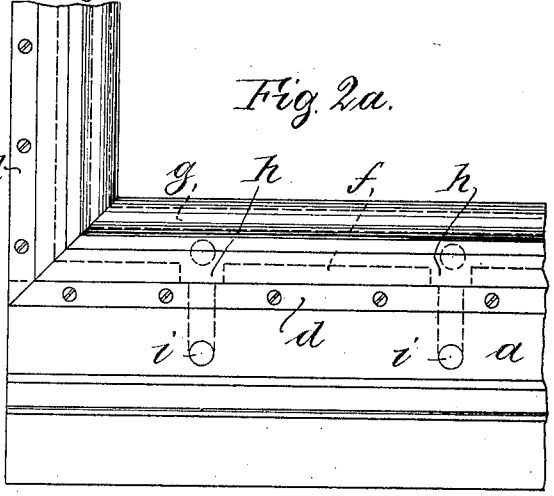

UNITED STATES PATENT OFFICE.

WILHELM SCHÄFER, OF MANNHEIM, GERMANY.

WINDOW-FRAME.

1,088,376.  Specification of Letters Patent.  Patented Feb. 24, 1914.

Application filed April 1, 1911. Serial No. 618,287.

*To all whom it may concern:*

Be it known that I, WILHELM SCHÄFER, a subject of the King of Bavaria, and resident of 53 Schwetzingerstrasse, Mannheim, in the German Empire, have invented certain new and useful Improvements in Window-Frames, of which the following is a specification.

This invention relates to improvements in the construction of window frames and particularly those intended for shop-windows, and has for its object to provide means whereby the glass shall not be too rigidly held in position, as the rigid securing of the glass in the frame renders the glass very easily liable to breakage or damage.

It has already been proposed to provide the frame with elastic or resilient insertions in order to obviate the effects due to warping or vibration of the frame. The pressure of such elastic or resilient insertions however upon the glass increases according to their compression, so that the glass is held in position by pressure, and furthermore it is necessary to fill up the joint between the frame and the glass by means of putty or other suitable jointing medium in order to protect the elastic or resilient insertion from the influence of the weather and from the water or steam condensed on the glass, which is liable to penetrate between the glass and the frame and which would then rapidly render the insertion non-elastic. This jointing medium however destroys the resiliency of the joint to a more or less degree and, moreover, as the jointing medium hardens, it is liable to leave a space between it and the glass through which the water may penetrate.

According to the present invention the joint is formed in such a manner that the glass is at no time subjected to the pressure of the jointing material, this being effected by the use of insertions of a soft and non-elastic nature and of weather-resisting material, such as comparatively thin lead or other suitable metal tubing which is unaffected by the influences of the weather.

In order that the invention may be more clearly understood, reference is made to the accompanying drawings, whereon my invention is illustrated together with certain features which form the subject matter of my United States Patent No. 1,045,617 dated Nov. 26, 1912.

Figure 1 is a vertical section through the upper part of a window frame and Fig. 1ª is a vertical section through the lower part of the frame. Fig. 2 is a detail side view of Fig. 1 and Fig. 2ª a detail side view of Fig. 1ª. Fig. 3 is a transverse section through the window frame.

The plinth $a$, the upper part of the frame $b$ and the two side posts $c$ are provided on both sides with strips $d$ $d'$ of metal or other suitable material detachably secured to the parts $a$, $b$ and $c$ by means of screws or the like, these strips $d$ and $d'$ forming grooves $e$ adapted to receive the glass $l$. Within these grooves $e$ are suitably secured, by glue or the like, a plurality of strips of resilient material, such as artificial cork or the like which has been rendered waterproof, these insertions $f$ having preferably intermediate spaces $h$ as may be seen from Figs. 2 and 2ª of the drawings. The strips $d$ and $d'$ are provided with semi-circular recesses adapted to receive a soft and non-elastic jointing medium of weather resisting material, said jointing medium being preferably of lead or other plastic material impervious to the action of water and preferably of tubular form. On the drawings lead pipes $g$ are shown inserted in the grooves in the strips $d$ and $d'$, these lead pipes $g$ contacting with the surfaces of the glass and thus holding the same in place, the glass resting upon the cork strips $f$ in the lower part of the frame and being separated from the frame at the sides and upper part thereof by similar cork-strips $f$. Depressions are preferably formed in the lead tubing $g$ at intervals so as to provide spaces between the lead tubing $g$ and the glass $l$ through which the water on the glass may penetrate, the water entering the groove $e$ and from there being conducted away by means of conduits $i$ located so as to open into the groove $e$ between the cork-strips $f$. The interior strip $d'$ of the frame is also preferably provided with ventilating holes $k$ which in conjunction with the conduits $i$ serve as ventilating means.

The glass $l$ is inserted in position after removing one of the strips $d$ or $d'$, after which the strips are again screwed up so that the lead tubes $g$ contact with the surfaces of the glass $l$. Owing to the soft and non-elastic nature of the lead tubes $g$ the latter give way under pressure so that any pressure upon the frame, which may, for example, be due to warping or other conditions, is taken up by the lead tubes $e$ and is not transmitted to the glass $l$, so that the glass always maintains its original form.

I claim:—

In a grooved window frame, a glass pane in the groove and means for holding the glass pane in position in said groove, comprising insertions of a soft and non-elastic nature and of weather-resisting material in said groove on both sides of said glass pane, said insertions comprising comparatively thin-walled lead tubing.

In witness whereof I have hereunto set my hand in the presence of two witnesses.

WILHELM SCHÄFER.

Witnesses:
  A. O. TITTMAN,
  S. H. SHANK.

Copies of this patent may be obtained for five cents each, by addressing the "Commissioner of Patents, Washington, D. C."